US011965096B2

(12) United States Patent
Miyama et al.

(10) Patent No.: US 11,965,096 B2
(45) Date of Patent: *Apr. 23, 2024

(54) RESIN COMPOSITION AND BIOLOGICAL MODEL USING SAME

(71) Applicant: DENKA COMPANY LIMITED, Tokyo (JP)

(72) Inventors: Akira Miyama, Tokyo (JP); Mutsumi Matsumoto, Tokyo (JP)

(73) Assignee: DENKA COMPANY LIMITED, Tokyo (JP)

( * ) Notice: Subject to any disclaimer, the term of this patent is extended or adjusted under 35 U.S.C. 154(b) by 461 days.

This patent is subject to a terminal disclaimer.

(21) Appl. No.: 17/283,172

(22) PCT Filed: Oct. 25, 2019

(86) PCT No.: PCT/JP2019/041865
§ 371 (c)(1),
(2) Date: Apr. 6, 2021

(87) PCT Pub. No.: WO2020/095715
PCT Pub. Date: May 14, 2020

(65) Prior Publication Data
US 2021/0340378 A1 Nov. 4, 2021

(30) Foreign Application Priority Data
Nov. 8, 2018 (JP) ................. 2018-210479

(51) Int. Cl.
C08L 91/00 (2006.01)
C08K 5/05 (2006.01)
C08K 5/09 (2006.01)
G09B 23/28 (2006.01)
G09B 23/30 (2006.01)

(52) U.S. Cl.
CPC ............... C08L 91/00 (2013.01); C08K 5/05 (2013.01); C08K 5/09 (2013.01); G09B 23/285 (2013.01); G09B 23/30 (2013.01)

(58) Field of Classification Search
CPC .... G09B 23/285; G09B 23/30; G09B 23/303; C08L 91/00; C08K 5/05; C08K 5/09
USPC ........................................................ 434/272
See application file for complete search history.

(56) References Cited

U.S. PATENT DOCUMENTS

| 5,904,967 | A | 5/1999 | Ezaki et al. | |
|---|---|---|---|---|
| 8,580,884 | B2* | 11/2013 | Ding | C08L 53/00 524/505 |
| 8,592,513 | B2* | 11/2013 | Fujiwara | C08L 23/10 524/505 |
| 9,102,849 | B2* | 8/2015 | Minamide | C09D 133/10 |
| 10,041,191 | B1* | 8/2018 | Tarutani | B29B 9/00 |
| 10,487,249 | B2* | 11/2019 | Araki | C09J 153/025 |
| 10,781,305 | B2* | 9/2020 | Matsumoto | C08L 27/12 |
| 10,836,897 | B2* | 11/2020 | Miyama | C08L 91/00 |
| 11,124,593 | B2* | 9/2021 | Sukegawa | C08F 8/12 |
| 11,472,955 | B2* | 10/2022 | Sasaki | C08L 23/06 |
| 2009/0192250 | A1* | 7/2009 | Ijichi | C08L 53/025 524/505 |
| 2010/0056715 | A1 | 3/2010 | Wang | |
| 2011/0245405 | A1* | 10/2011 | Jogo | C08L 91/00 524/534 |
| 2011/0319837 | A1 | 12/2011 | Uehara et al. | |
| 2012/0190786 | A1* | 7/2012 | Sasaki | A61J 1/1412 524/505 |
| 2014/0102930 | A1* | 4/2014 | Sasaki | A61J 1/1412 206/438 |
| 2017/0044371 | A1 | 2/2017 | Ono | |
| 2018/0030195 | A1 | 2/2018 | Oshita et al. | |
| 2018/0061279 | A1 | 3/2018 | Niimi et al. | |
| 2018/0371250 | A1 | 12/2018 | Karube | |
| 2019/0390054 | A1 | 12/2019 | Ishii | |
| 2020/0022799 | A1 | 1/2020 | Yamashita et al. | |
| 2020/0157339 | A1 | 5/2020 | Sasaki et al. | |
| 2020/0362170 | A1 | 11/2020 | Karube | |
| 2021/0330865 | A1* | 10/2021 | Miyama | G09B 23/30 |
| 2021/0340378 | A1* | 11/2021 | Miyama | G09B 23/285 |

FOREIGN PATENT DOCUMENTS

| EP | 3560993 | A1 | 10/2019 |
|---|---|---|---|
| JP | H05269196 | A | 10/1993 |
| JP | H08208964 | A | 8/1996 |
| JP | H08332218 | A | 12/1996 |
| JP | H09-208836 | A | 8/1997 |
| JP | 2001181472 | A | 7/2001 |
| JP | 2004323552 | A | 11/2004 |
| JP | 2014186281 | A | 10/2014 |
| JP | 2016158765 | A | 9/2016 |
| WO | 2008072517 | A1 | 6/2008 |
| WO | 2010104068 | A1 | 9/2010 |
| WO | 2015162976 | A1 | 10/2015 |
| WO | 2015177926 | A1 | 11/2015 |

(Continued)

OTHER PUBLICATIONS

Extended European Search Report for European Application No. 19881988.0 dated Nov. 19, 2021.

(Continued)

Primary Examiner — Joseph B Baldori
(74) Attorney, Agent, or Firm — Pearne & Gordon LLP

(57) ABSTRACT

[Problem] To provide a resin composition that can lead to a biological model, which has a softness and provides a sensation of needle insertion close to those of human blood vessels and/or skin, and a biological model using the same.
[Solution] A resin composition containing, with respect to 100 parts by mass of a component (A) hydrogenated block copolymer having a MFR (temperature 230° C., load 2.16 kg) of 1 g/10 min or less: 350 parts by mass or more and 1000 parts by mass or less of a component (B) oil; and 0.01 parts by mass or more and less than 150 parts by mass of a component (C) lubricant. The component (B) oil preferably has a kinematic viscosity of 0.1-100 $mm^2/s$ at 37.8° C. or 40° C.

6 Claims, No Drawings

(56) References Cited

FOREIGN PATENT DOCUMENTS

| WO | 2017042604 A1 | 3/2017 |
| WO | 2017150714 A1 | 9/2017 |
| WO | 2018097311 A1 | 5/2018 |
| WO | 2018117212 A1 | 6/2018 |
| WO | 2018151320 A1 | 8/2018 |

OTHER PUBLICATIONS

Search Report for International Application No. PCT/JP2019/041865 dated Jan. 21, 2020.

* cited by examiner

RESIN COMPOSITION AND BIOLOGICAL MODEL USING SAME

TECHNICAL FIELD

The present invention relates to resin compositions and biological models using same.

BACKGROUND ART

Biological models simulating parts of the human body are formed using resin compositions. Other than in vivo grafting, the models are used for the acquisition of surgical treatment or examination skills. They are also widely used as materials in robots, anatomical models, etc. Various attempts have been made on the resin compositions for biological models in order to obtain molded articles that are as close to parts of the human body as possible not only in appearance but also in weight, tactile sensation, sensation of incision, etc. Patent Document 1 proposes artificial skin for practicing suturing, characterized by a structure of at least three layers composed of a polyurethane-based material. It is considered that this technology results in a realistic surface configuration after suturing without stickiness on the skin surface as in silicon products. Patent Document 2 proposes a silicone elastomer composition for artificial skin which satisfies prescribed parameters. It is thought that this technology can provide silicone elastomers with tactile sensation similar to that of skin. Patent Document 3 proposes a compound resin and an anatomical model, containing prescribed amounts of a hydrogenated block copolymer and an oil having a prescribed kinematic viscosity. It is thought that this technology can achieve a compound resin and an anatomical model which have a specific weight close to that of the human body, a texture that is close to that of human skin or organ, and high durability. Patent Document 4 proposes a resin composition containing prescribed amounts of a hydrogenated block copolymer having a prescribed MFR, an oil, and a polyolefin-based resin having a prescribed specific surface area. This technology enables the achievement of a softer resin composition in which high loading of oil is possible and bleed-outs can be suppressed.

CITATION LIST

Patent Literature

Patent Document 1: WO 2015/177926 A
Patent Document 2: WO 2008/072517 A
Patent Document 3: WO 2017/042604 A
Patent Document 4: WO 2018/151320 A

SUMMARY OF INVENTION

Technical Problem

Among biological models, those used as artificial blood vessels and artificial skin, in addition to being soft, are required to provide a sensation of needle insertion and passability for needles and threads close to those of human skin and blood vessels. However, when conventionally proposed polyurethane-based materials or silicone-based materials are used, it is difficult to achieve a sensation of needle insertion and passability for needles and threads close to those of human skin and blood vessels.

The present invention addresses the problem of providing: a resin composition which can lead to a molded article that is highly soft and provides a sensation of needle insertion and passability for needles and threads close to those of blood vessels and/or skin of animals including humans; and a biological model which uses the resin composition.

Solution to Problem

The present invention relates to the following.
[1] A resin composition containing, with respect to 100 parts by mass of a component (A) hydrogenated block copolymer having a MFR (temperature 230° C., load 2.16 kg) of 1 g/10 min or less: 350 parts by mass or more and 1000 parts by mass or less of a component (B) oil; and 0.01 parts by mass or more and less than 150 parts by mass of a component (C) lubricant.
[2] The resin composition according to [1], wherein the resin composition is for an artificial blood vessel and/or artificial skin.
[3] The resin composition according to [1] or [2], wherein the component (B) oil has a kinematic viscosity of 0.1-100 mm$^2$/s at 37.8° C. or 40° C.
[4] The resin composition according to any one of [1] to [3], wherein the component (C) lubricant contains one or more selected from ionic surfactants and nonionic surfactants.
[5] The resin composition according to any one of [1] to [4], wherein the resin composition is thermoplastic.
[6] A biological model formed using the resin composition according to any one of [1] to [5].
[7] The biological model according to [6], wherein the biological model is an artificial blood vessel or artificial skin.

Effects of Invention

According to the present invention, it is possible to provide: a resin composition which can lead to a molded article that is highly soft and provides a sensation of needle insertion and passability for needles and threads close to those of blood vessels and/or skin of animals including humans; and a biological model which uses the resin composition.

DESCRIPTION OF EMBODIMENTS

An embodiment of the present invention shall be explained in detail below. The present invention is not limited to the following embodiment and can be carried out with modifications as appropriate so long as the effects of the invention are not inhibited. Further, in the present invention, "A-B" means A or more and B or less.
[Resin Composition]
The resin composition according to the present embodiment contains, as a component (A), a hydrogenated block copolymer satisfying prescribed conditions, as a component (B), an oil, and as a component (C), a lubricant, each at a prescribed amount. This enables the achievement of a resin composition that leads to a molded article, such as a biological model, which is highly soft and is capable of realizing a sensation of needle insertion and passability for needles and threads close to those of blood vessels and/or skin of animals including humans.
<Component (A) Hydrogenated Block Copolymer>
The component (A) hydrogenated block copolymer preferably contains one or more hydrogenated products (hydrogen-added products or hydrides) of an aromatic vinyl-conjugated diene block copolymer containing a block unit (X) derived from an aromatic vinyl compound and a block unit (Y) derived from a conjugated diene.

Forms of aromatic vinyl-conjugated diene block copolymers having such a configuration are represented by, for example, $X(YX)_n$ or $(XY)_n$ (where n is an integer of 1 or greater). Among these, those with the form $X(YX)_n$, particularly those with the form X-Y-X, are preferred. The X-Y-X form is preferably at least one copolymer selected from the group consisting of a polystyrene-polybutadiene-polystyrene block copolymer, a polystyrene-polyisoprene-polystyrene block copolymer, and a polystyrene-polyisoprene/butadiene-polystyrene block copolymer.

In such an aromatic vinyl-conjugated diene block copolymer, the aromatic vinyl block unit (X), which is a hard segment, exists as a cross-linking point for the conjugated diene rubber block unit (Y) and forms a pseudo cross-link (domain). This conjugated diene rubber block unit (Y) that is present between the aromatic vinyl block units (X) is a soft segment and exhibits rubber elasticity.

Examples of aromatic vinyls that form the block unit (X) include styrene, α-methylstyrene, 3-methylstyrene, p-methylstyrene, 4-propyl styrene, 4-dodecyl styrene, 4-cyclohexylstyrene, 2-ethyl-4-benzyl styrene, 4-(phenylbutyl)styrene, 1-vinylnaphthalene, and 2-vinylnaphthalene, etc. Among these, styrene is preferred.

Examples of conjugated dienes that form the block unit (Y) include butadiene, isoprene, pentadiene, 2,3-dimethyl butadiene, and combinations thereof, etc. Among these, at least one conjugated diene selected from the group consisting of butadiene, isoprene, and a combination of butadiene and isoprene (unit of butadiene-isoprene copolymer) is preferred. It is also possible to use one or more of these conjugated dienes in combination. The conjugated diene block unit (Y) formed from units of butadiene-isoprene copolymer may be any of an unit of a random copolymer of butadiene and isoprene, a block unit of copolymer thereof, or an unit of a tapered copolymer thereof.

In an aromatic vinyl-conjugated diene block copolymer as described above, the content of the aromatic vinyl block unit (X) is preferably 5 mass % or more and 50 mass % or less, and more preferably 20 mass % or more and 40 mass % or less. The content of this aromatic vinyl unit can be measured by a normal method such as infrared spectroscopy, NMR spectroscopy, etc.

Aromatic vinyl-conjugated diene block copolymers such as those described above can be produced by various methods. Examples of production methods include (1) a method of consecutively polymerizing an aromatic vinyl compound and then a conjugated diene using an alkyl lithium compound such as n-butyllithium as an initiator, (2) a method of polymerizing an aromatic vinyl compound and then a conjugated diene, and coupling the same by means of a coupling agent, and (3) a method of consecutively polymerizing a conjugated diene and then an aromatic vinyl compound using a lithium compound as an initiator.

The hydrogenated block copolymer is a product (hydrogen-added product or hydride) of an aromatic vinyl-conjugated diene block copolymer such as those described above hydrogenated by a publicly known method, wherein the preferred hydrogenation rate is 90 mol % or more. This hydrogenation rate is a value when the entire amount of carbon-carbon double bonds in the conjugated diene block unit (Y) is set as 100 mol %. A "hydrogenation rate of 90 mol % or more" indicates that 90 mol % or more of the carbon-carbon double bonds are hydrogenated. Examples of such hydrogenated block copolymers include polystyrene-poly(ethylene/propylene) block (SEP), polystyrene-poly(ethylene/propylene) block-polystyrene (SEPS), polystyrene-poly(ethylene/butylene) block-polystyrene (SEBS), polystyrene-poly(ethylene-ethylene/propylene) block-polystyrene (SEEPS), etc. More specific examples include SEPTON (manufactured by Kuraray Co. Ltd.), Kraton (manufactured by Shell Chemicals), Kraton G (manufactured by Shell Chemicals), and Tuftec (manufactured by Asahi Kasei Corp.) (the above are proprietary names).

The melt flow rate (MFR (temperature 230° C., load 2.16 kg)) of the component (A) hydrogenated block copolymer is 1 g/10 min. or less and is preferably less than 0.1 g/10 min. "MFR (temperature 230° C., load 2.16 kg)" refers to MFR measured under the conditions of a temperature of 230° C. and a load of 2.16 kg in accordance with JIS K7210. If the MFR is higher than this value, upon the addition of oil, bleed-out (oil seepage) occurs easily and mechanical strength decreases. The hydrogenation rate is measured by a publicly known method such as nuclear magnetic resonance (NMR) spectroscopy.

In the present embodiment, SEEPS is preferred as the component (A) hydrogenated block copolymer having a MFR (measured at a temperature of 230° C. and a load of 2.16 kg) of 1 g/10 min. or less. In the present specification, the "component (A) hydrogenated block copolymer having a MFR (measured at a temperature of 230° C. and a load of 2.16 kg) of 1 g/10 min. or less" may be simply mentioned as the "component (A) hydrogenated block copolymer satisfying specific conditions" or the "component (A) hydrogenated block copolymer." In terms of oil absorption work before kneading, it is preferable that the form of the component (A) hydrogenated block copolymer satisfying specific conditions is a powder or an amorphous (crumb) form.

<Component (B) Oil>

As the component (B) oil, preferred examples include mineral oil-based oils such as paraffin-based process oil, naphthene-based process oil, aromatic-based process oil, and liquid paraffin, and silicon oil, castor oil, linseed oil, olefin-based wax, mineral-based wax, etc. Among these, paraffin-based and/or naphthene-based process oils are preferred. Examples of the process oil include the Diana Process Oil series (manufactured by Idemitsu Kosan Co., Ltd.), JOMO Process P (manufactured by Japan Energy Corporation), etc. Moreover, it is also possible to use various ester-based plasticizers that are phthalic acid-based, trimellitic acid-based, pyromellitic acid-based, adipic acid-based, or citric acid-based. They may be used individually or in combination. By including the component (B) oil, softness can be adjusted, and a softer resin composition can be achieved. Consequently, it is possible to achieve a resin composition that leads to a biological model having a softness and physical properties similar to those of blood vessels and/or skin of animals including humans. In terms of workability, it is preferable that the component (B) oil is pre-absorbed in advance in a hydrogenated block copolymer that satisfies the specific conditions for component (A). To do so, it is preferable that the form of the hydrogenated block copolymer satisfying the specific conditions for component (A) is a powder or an amorphous (crumb) form, which absorbs oil easily.

The component (B) oil preferably has a kinematic viscosity at 37.8° C. or 40° C. of 0.1-100 $mm^2/s$, more preferably 0.1-50 $mm^2/s$, and even more preferably 0.1-15 $mm^2/s$. By making the kinematic viscosity within the above range, a resin composition that leads to a biological model, which is highly soft and has physical properties similar to those of blood vessels and/or skin of animals including humans can be easily obtained. Kinematic viscosity measurements can be made by measuring at a test temperature of 37.8° C. or 40° C. using a Cannon-Fenske viscometer according to JIS K 2283:2000 "5. Kinematic Viscosity Testing Method."

<Component (C) Lubricant>

As the component (C) lubricant, examples include ionic surfactants, nonionic surfactants, hydrocarbon-based glidants, fatty acid-based glidants, aliphatic amide-based glidants, metallic soap-based glidants, ester-based glidants, etc.

As the ionic surfactant, an anionic surfactant, a cationic surfactant, or an amphoteric surfactant can be used. Examples of the anionic surfactant include fatty acids sodium, monoalkyl sulfates, alkylpolyoxyethylene sulfates, alkylbenzene sulfonates, mono alkyl phosphates, etc. Examples of commercial products include the proprietary name "Electrostripper PC" manufactured by Kao Corporation, etc.

Examples of cationic surfactants include alkyltrimethylammonium salts, dialkyldimethylammonium salts, alkylbenzyldimethylammonium salts, etc.

Examples of amphoteric surfactants include alkyldimethylamine oxides, alkylcarboxybetaines, etc.

Examples of nonionic surfactants include polyoxyethylene alkyl ethers, fatty acid sorbitan esters, alkylpolyglucoside, fatty acid diethanolamides, alkylmonoglyceryl ethers, etc. and examples of commercial products include "Electrostripper EA" manufactured by Kao Corporation, etc.

Examples of hydrocarbon-based glidants include paraffin wax, synthetic polyethylene wax, octyl alcohol, etc. Examples of fatty acid-based glidants include stearic acid, stearyl alcohol, etc.

Examples of aliphatic amide-based glidants include fatty acid amides such as stearamide, oleamide, and erucamide; alkylene fatty acid amides such as methylene bis stearamide, ethylene bis stearamide; etc. Examples of metallic soap-based glidants include metal stearates, etc.

Examples of ester-based glidants include fatty acid esters of alcohols, monoglyceride stearate, stearyl stearate, hydrogenated oils, etc.

For the component (C) lubricant, one or more selected from the above lubricants can be used. Among them, in terms of the resin composition that leads to a biological model having a softness and physical properties similar to those of human blood vessels and/or skin, it is preferred that one or more selected from ionic surfactants or nonionic surfactants are included, and it is preferred that one or more surfactants selected from nonionic surfactants are included.

<Content Ratio>

The resin composition contains: with respect to 100 parts by mass of the component (A) hydrogenated block copolymer; 350 parts by mass or more and 1000 parts by mass or less, preferably 400 parts by mass or more and 800 parts by mass or less, and more preferably 450 parts by mass or more and 700 parts by mass or less, of the component (B) oil; and 0.01 parts by mass or more and 150 parts by mass or less, preferably 10 parts by mass and 100 parts by mass or less, and more preferably 10 parts by mass or more and 50 parts by mass or less, of the component (C) lubricant. By making the content ratios within the above ranges, it is possible to achieve a resin composition that leads to a biological model, which is highly soft and provides a sensation of needle insertion and passability for needles and threads close to those of blood vessels and/or skin of animals such as humans. Moreover, bleed-outs of molded articles can also be better prevented.

<Additives, Etc.>

The resin composition can include and use, as necessary, rubber, a plasticizer, a filler or stabilizer, an antioxidant, a light resistance improver, an ultraviolet absorber, a softener, a glidant, a processing aid, a colorant, an anti-static agent, an anti-fogging agent, an anti-blocking agent, a crystal nucleating agent, a foaming agent, etc. The content thereof is preferably 0.01 parts by mass or more and 500 parts by mass or less with respect to 100 parts by mass of the component (A) hydrogenated block copolymer.

The resin composition may contain, as necessary, another resin or elastomer. There are no particular restrictions with respect to this other resin or elastomer, but examples thereof include polyolefins such as polyethylene, polypropylene, ethylene-propylene copolymer, and ethylene-vinyl acetate copolymer (EVA); styrene-based thermoplastic elastomers such as styrene-butadiene copolymer, styrene-isoprene copolymer, styrene-butadiene-isoprene copolymer, styrene-ethylene-butadiene-styrene copolymer (SEBS), and styrene-ethylene-propylene-styrene copolymer (SEPS); acrylonitrile-butadiene-styrene copolymer (ABS resin), acrylonitrile-styrene copolymer (AS resin), polystyrene, polyvinyl chloride, polyvinylidene chloride, fibrous fillers, etc. These may be used individually or as a combination of two or more. When the other resin or elastomer is included, the content thereof is preferably 0.01 parts by mass or more and 500 parts by mass or less with respect to 100 parts by mass of the component (A) hydrogenated block copolymer.

<Resin Composition>

In terms of production costs and balance of physical properties, the resin composition is preferably thermoplastic. Since the resin composition according to the present embodiment contains the abovementioned hydrogenated block copolymer satisfying the prescribed conditions for component (A), the component (B) oil, and the component (C) lubricant at prescribed contents, it is possible to realize high softness as well as a sensation of needle insertion and passability for needles and threads close to those of blood vessels and/or skin of animals including humans. As such, the resin composition can be preferably used as biological models of artificial blood vessels and/or artificial skin, etc.

(Softness)

Softness can be evaluated by type E hardness. Type E hardness can be determined by overlaying four 5.0 mm-thick sheets and determining the type E durometer hardness, as an instantaneous value, under the condition of 23±1° C. in accordance with the JIS K7215 durometer hardness testing method for plastics.

The resin composition preferably has a type E hardness, measured in accordance with the JIS K7215 durometer hardness testing method for plastics, of 50 or less and more preferably 0.1 or more and 50 or less. In terms of achieving a softness close to that of blood vessels and/or skin of animals including humans, the type E hardness is preferably 50 or less and more preferably 30 or less. It is particularly preferably les s than 10.

(Sensation of Needle Piercing and Insertion)

The sensation of needle piercing and insertion (needle piercing resistance) can be evaluated by measuring the load value (N) and displacement (mm) of a first peak upon needle penetration when puncturing at a speed of 1000 mm/min using a tubular or oblong sheet-shaped test piece under the condition of 23° C.±1° C. using a universal testing machine (e.g., Autograph AG-Xplus testing machine manufactured by Shimadzu Corporation). The thickness and the size of the test piece are determined on the basis of the site of interest in a medical simulator. The size of the needle is determined on the basis of whether the needle is for injection practice or for suturing practice.

The resin composition preferably has a load value measured as described above of 0.1 N or more and 1 N or less and more preferably 0.1 N or more and 0.5 N or less. The displacement is preferably 1 mm or more and 50 mm or less and more preferably 3 mm or more and 20 mm or less.

(Needle Passing Resistance and Thread Passing Resistance)

The resin composition is preferably configured to have a response (passability for needles and threads, also referred to as "needle passing resistance" and "thread passing resistance" herein) similar to when human blood vessels and/or skin is punctured and sutured, or when a thread is passed therethrough.

Needle passing resistance and thread passing resistance can be evaluated by measuring, with a universal testing machine (e.g., Autograph AG-Xplus testing machine manufactured by Shimadzu Corporation), load values (hereinafter also referred to as "needle passing resistance" and "thread passing resistance") applied on a puncture needle or a medical thread upon puncturing. The thickness and the size of the test piece are determined according to the site of interest in the medical simulator. The size of the needle is determined on the basis of whether the needle is for injection practice or for suturing practice. The size of the thread is determined on the basis of the site in the medical simulator.

The resin composition preferably has a load value (needle passing resistance) applied on the puncture needle, measured as described above, of 0.1 N or more and 1 N or less and more preferably 0.1 N or more and 0.5 N or less.

The resin composition preferably has a load value (thread passing resistance) on the medical thread, measured as described above, of 0.01 N or more and 0.1 N or less and more preferably 0.01 N or more and 0.05 N or less.

(Production Method)

The method for producing the resin composition is not limited in particular, and a publicly known, appropriate blending method can be used. For example, melt-kneading can be performed with a single screw extruder, a twin screw extruder, a Banbury type mixer, a plastomill, a co-kneader, a heating roll, etc. Before melt-kneading is performed, the raw materials may be mixed uniformly by a Henschel mixer, a ribbon blender, a super mixer, a tumbler, etc. The melt-kneading temperature is not limited in particular, but is generally 50-300° C., and preferably 70-250° C.

[Biological Model]

A biological model according to the present embodiment is formed using the resin composition described above. The above-mentioned resin composition has a softness close to that of human blood vessels and/or skin and provides a sensation of needle piercing and insertion as well as a passability for needles and threads close to those of the human body, and can thus be preferably used as biological models that are artificial blood vessels and/or artificial skin. The structures of the artificial blood vessel and/or artificial skin are not limited in particular but may be formed with a single layer or with two or more layers (e.g., three layers with an inner layer, an intermediate layer, and an outer layer).

The method for producing the biological model is not limited in particular, and the model can be produced by a publicly known molding method. For example, various molding methods such as extrusion molding, cast molding, injection molding, vacuum molding, blow molding, etc. can be used in accordance with the target biological model.

EXAMPLES

The present invention shall be explained in more detail by referring to the examples below, but interpretation of the present invention is not to be limited by these examples.

The materials used in the examples and comparative examples are as follows. In addition, the MFR values below are values obtained at a temperature of 230° C. and a load of 2.16 kg.

<Hydrogenated Block Copolymers Satisfying Specific Conditions for Component (A)>

(A-1) SEEPS ("SEPTON4033" manufactured by Kuraray Co. Ltd., MFR 1 g/10 min., styrene content 30 mass %)

(A-2) SEEPS ("SEPTON4044" manufactured by Kuraray Co. Ltd., MFR 1 g/10 min., styrene content 30 mass %)

(A-3) SEEPS ("SEPTON4055" manufactured by Kuraray Co. Ltd., MFR 1 g/10 min., styrene content 30 mass %)

(A-4) SEEPS ("SEPTON-J" manufactured by Kuraray Co. Ltd., MFR 1 g/10 min., styrene content 40 mass %)

(A-5) SEEPS ("SEPTON4077" manufactured by Kuraray Co. Ltd., MFR 1 g/10 min., styrene content 30 mass %)

(A-6) SEEPS ("SEPTON4099" manufactured by Kuraray Co. Ltd., MFR 1 g/10 min., styrene content 30 mass %)

<Comparison Component (A)>

Silicone resin (silicone elastomer resin)

Polyurethane resin (polyurethane elastomer resin)

Natural rubber

<Component (B) Oil>

(B-1) Paraffin-based oil ("PW-90" manufactured by Idemitsu Kosan, Co., Ltd.), kinematic viscosity 90.5 $mm^2/s$ at 40° C.

(B-2) Paraffin-based oil ("PW-32" manufactured by Idemitsu Kosan, Co., Ltd.), kinematic viscosity 30.6 $mm^2/s$ at 40° C.

(B-3) Paraffin-based oil ("PARLEAM 6" manufactured by NOF Corporation), kinematic viscosity 21.4 $mm^2/s$ at 37.8° C.

(B-4) Paraffin-based oil ("PARLEAM EX" manufactured by NOF Corporation), kinematic viscosity 10.6 $mm^2/s$ at 37.8° C.

Kinematic viscosity values are values measured at a test temperature of 37.8° C. or 40° C. using a Cannon-Fenske viscometer according to JIS K 2283:2000 "5. Kinematic Viscosity Testing Method."

<Component (C) Lubricant>

(C-1) Stearyl alcohol ("KALKOL 8098" manufactured by Kao Corporation)

(C-2) Octyl alcohol ("KALKOL 0898" manufactured by Kao Corporation)

(C-3) Nonionic surfactant ("Electrostripper EA" manufactured by Kao Corporation)

(C-4) Anionic surfactant ("Electrostripper PC" manufactured by Kao Corporation)

(C-5) Ester blend surfactant ("KAOWAX 220" manufactured by Kao Corporation)

(C-6) Ethylene bis stearamide ("KAOWAX EB-FF" manufactured by Kao Corporation)

(C-7) Stearic acid ("LUNAC S-50V" manufactured by Kao Corporation)

Example 1

Resin compositions were obtained by melt-kneading the materials shown in Table 1 at the content ratios shown in Table 1. Melt-kneading was performed as follows. The component (A) hydrogenated block copolymer is supplied from the maker as an amorphous powder. Several days before kneading, a prescribed amount of the component (C) lubricant was added to the component (A) hydrogenated block copolymer, then a prescribed amount of the component (B) oil was dripped thereon and allowed to sufficiently infiltrate. The amounts of the component (B) oil, which was allowed to infiltrate, and the component (C) lubricant are included in the blending quantities shown in Table 1. A Brabender Plasti-Corder (PL2000 manufactured by Brabender GmbH) was used, all of the raw materials were introduced and then kneaded for six minutes at 150° C. and a rotation speed of 50 revolutions/min. to obtain a resin composition.

Examples 2-14 and Comparative Examples 1-19

Resin compositions were obtained in the same manner as in Example 1, except that the compositions shown in Tables 1 and 2 were used.

[Measurement and Evaluation]
(Sample Production)

Oblong sheet samples for physical property evaluation were produced using the obtained resin compositions. The oblong sheet samples were produced as follows. By hot-pressing (150° C., time 5 min., pressure 50 kg/cm$^2$), the resin compositions were molded into thicknesses respectively described in the below-mentioned testing methods to make oblong sample sheets. Moreover, as Reference Examples 1-3, porcine aorta, vena cava, and carotid samples (20 mm×20 mm×thickness 1.75 mm) were prepared. Porcine blood vessels are known to resemble human blood vessels in terms of various physical properties such as softness and tactile sensation.

The following measurements and evaluation were made using the obtained oblong sheet samples and the samples of Reference Examples 1-3. Moreover, during the making of the oblong samples, the surfaces were visually inspected to confirm whether or not there was oil bleed-out (presence or absence of bleed-out). The measurement and evaluation results are shown in Tables 1 and 2.

(Type E Hardness)

Type E durometer hardness was determined using oblong sheet samples, with four overlaid sheets of 50 mm×50 mm×thickness 5.0 mm, under the condition of 23±1° C. in accordance with the JIS K7215 durometer hardness testing method for plastics. This hardness is an instantaneous value.

(Sensation of Needle Piercing and Insertion)

Oblong sheet samples of 50 mm×50 mm×thickness 2 mm were evaluated for the sensation of needle piercing and insertion based on the following criteria, by using an Autograph AG-Xplus testing machine manufactured by Shimadzu Corporation and measuring the first peak load value and displacement (needle piercing resistance) upon needle penetration when punctured at a speed of 1000 mm/min. under the condition of 23±1° C.

4: First peak load value upon needle penetration is 0.1 N or more and less than 0.3 N.

3: First peak load value upon needle penetration is 0.3 N or more and less than 0.6 N.

2: First peak load value upon needle penetration is 0.6 N or more and less than 0.8 N.

1: First peak load value upon needle penetration is 0.8 N or more.

(Passability for Puncture Needle/Medical Thread)

The Autograph AG-Xplus testing machine manufactured by Shimadzu Corporation was used to measure the load values applied on puncture needles (size: 17 G) and medical threads (size: 4-0 made of polypropylene) when puncturing at a speed of 1000 mm/min. using oblong sheet-shaped test pieces of 50 mm×50 mm×thickness 2 mm. The results are respectively shown as "needle passing resistance (N)" and "thread passing resistance (N)" in Tables 1 and 2.

TABLE 1

| | Component (A) | | | | | | Component (B) | | | | Componen (C) | | | | | | |
|---|---|---|---|---|---|---|---|---|---|---|---|---|---|---|---|---|---|
| | A-1 | A-2 | A-3 | A-4 | A-5 | A-6 | B-1 | B-2 | B-3 | B-4 | C-1 | C-2 | C-3 | C-4 | C-5 | C-6 | C-7 |
| Example 1 | 100 | | | | | | | | | 500 | 12 | | | | | | |
| Example 2 | 100 | | | | | | | | | 500 | 24 | | | | | | |
| Example 3 | | 100 | | | | | | | | 500 | 24 | | | | | | |
| Example 4 | | | 100 | | | | | | | 500 | 24 | | | | | | |
| Example 5 | | | 100 | | | | | | | 500 | 36 | | | | | | |
| Example 6 | | | 100 | | | | | | | 600 | 28 | | | | | | |
| Example 7 | | | | 100 | | | | | | 500 | 24 | | | | | | |
| Example 8 | | | | 100 | | | | | | 500 | 36 | | | | | | |
| Example 9 | | | | 100 | | | | | | 600 | 28 | | | | | | |
| Example 10 | | | | | 100 | | | | | 500 | 24 | | | | | | |
| Example 11 | | | | | | 100 | | | | 500 | 24 | | | | | | |
| Example 12 | 100 | | | | | | | | | 500 | | | | 24 | | | |
| Example 13 | | | | | | | | | | 500 | | | | | | 24 | |
| Example 14 | | | | | | | | | | 500 | | 24 | | | | | |
| Ref. Ex. 1 (porcine aorta) | | | | | | | | | | | | | | | | | |
| Ref. Ex. 2 (porcine vena cava) | | | | | | | | | | | | | | | | | |
| Ref. Ex. 3 (porcine) | | | | | | | | | | | | | | | | | |

TABLE 1-continued

| | Type E hardness | Bleed-out | Sensation of needle piercing and insertion | Needle piercing resistance Penetration strength (N) | Needle piercing resistance Displacement at penetration | Needle passing resistance (N) | Thread passing resistance (N) |
|---|---|---|---|---|---|---|---|
| Example 1 | 7 | No | 3 | 0.55 | 15.63 | 0.42 | 0.048 |
| Example 2 | 5 | No | 4 | 0.22 | 10.69 | 0.17 | 0.040 |
| Example 3 | 6 | No | 3 | 0.52 | 13.94 | 0.48 | 0.067 |
| Example 4 | 3 | No | 3 | 0.59 | 20.78 | 0.46 | 0.048 |
| Example 5 | 2 | No | 4 | 0.27 | 13.17 | 0.22 | 0.023 |
| Example 6 | 1 | No | 4 | 0.23 | 13.45 | 0.18 | 0.032 |
| Example 7 | 1 | No | 3 | 0.39 | 17.44 | 0.31 | 0.047 |
| Example 8 | 0.4 | No | 4 | 0.28 | 16.94 | 0.21 | 0.020 |
| Example 9 | 0[*] | No | 4 | 0.25 | 17.11 | 0.21 | 0.021 |
| Example 10 | 1 | No | 3 | 0.60 | 25.33 | 0.47 | 0.043 |
| Example 11 | 0[*] | No | 3 | 0.57 | 26.28 | 0.45 | 0.042 |
| Example 12 | 6 | No | 2 | 0.62 | 16.21 | 0.48 | 0.055 |
| Example 13 | 8 | No | 2 | 0.69 | 17.30 | 0.56 | 0.081 |
| Example 14 | 7 | No | 2 | 0.78 | 20.04 | 0.66 | 0.092 |
| Ref. Ex. 1 (porcine aorta) | 5 | — | 2 | 0.88 | 3.29 | 0.76 | 0.042 |
| Ref. Ex. 2 (porcine vena cava) | 6 | — | 2 | 0.68 | 4.89 | 0.55 | 0.010 |
| Ref. Ex. 3 (porcine) | 5 | — | 3 | 0.54 | 5.16 | 0.41 | 0.039 |

[*]Measurement limit value or below
Content unit is "parts by mass."

TABLE 2

| | Component (A) | | | | | | Component (B) | | | | Componen (C) | | | | | | |
|---|---|---|---|---|---|---|---|---|---|---|---|---|---|---|---|---|---|
| | A-1 | A-2 | A-3 | A-4 | A-5 | A-6 | B-1 | B-2 | B-3 | B-4 | C-1 | C-2 | C-3 | C-4 | C-5 | C-6 | C-7 |
| Comp. Ex. 1 | 100 | | | | | | | | | 500 | | | | | | | |
| Comp. Ex. 2 | 100 | | | | | | | 400 | | | | | | | | | |
| Comp. Ex. 3 | 100 | | | | | | | | 400 | | | | | | | | |
| Comp. Ex. 4 | 100 | | | | | | 300 | | | | | | | | | | |
| Comp. Ex. 5 | 100 | | | | | | 300 | | | | 16 | | | | | | |
| Comp. Ex. 6 | 100 | | | | | | 300 | | | | | 16 | | | | | |
| Comp. Ex. 7 | 100 | | | | | | 300 | | | | | | 16 | | | | |
| Comp. Ex. 8 | 100 | | | | | | 300 | | | | | | | 16 | | | |
| Comp. Ex. 9 | 100 | | | | | | 300 | | | | | | | | 16 | | |
| Comp. Ex. 10 | 100 | | | | | | 300 | | | | | | | | | 16 | |
| Comp. Ex. 11 | 100 | | | | | | 300 | | | | | | | | | | 16 |
| Comp. Ex. 12 | 100 | | | | | | | 300 | 300 | | | | | | | | |
| Comp. Ex. 13 | 100 | | | | | | | 300 | | | | | | | | | |
| Comp. Ex. 14 | 100 | | | | | | | | 300 | | | | | | | | |
| Comp. Ex. 15 | 100 | | | | | | | 400 | | | | | | | | | |
| Comp. Ex. 16 | 100 | | | | | | | | | 500 | 150 | | | | | | |
| Comp. Ex. 17 (silicone) | | | | | | | | | | | | | | | | | |
| Comp. Ex. 18 (polyurethane) | | | | | | | | | | | | | | | | | |
| Comp. Ex. 19 (natural | | | | | | | | | | | | | | | | | |

| | Type E hardness | Bleed-out | Sensation of needle piercing and insertion | Needle piercing resistance Penetration strength (N) | Needle piercing resistance Displacement at penetration | Needle passing resistance (N) | Thread passing resistance (N) |
|---|---|---|---|---|---|---|---|
| Comp. Ex. 1 | 10 | No | 1 | 1.03 | 15.16 | 0.92 | 0.053 |
| Comp. Ex. 2 | 15 | No | 1 | 1.13 | 9.04 | 1.04 | 0.079 |
| Comp. Ex. 3 | 13 | No | 1 | 1.00 | 9.26 | 0.89 | 0.075 |
| Comp. Ex. 4 | 22 | No | 1 | 1.33 | 6.13 | 1.19 | 0.155 |
| Comp. Ex. 5 | 21 | No | 1 | 1.12 | 6.93 | 1.02 | 0.152 |
| Comp. Ex. 6 | 22 | No | 1 | 1.18 | 7.27 | 1.05 | 0.175 |
| Comp. Ex. 7 | 20 | No | 2 | 0.67 | 8.67 | 0.59 | 0.144 |
| Comp. Ex. 8 | 20 | No | 2 | 0.69 | 8.89 | 0.58 | 0.155 |
| Comp. Ex. 9 | 21 | No | 1 | 1.01 | 7.73 | 0.93 | 0.154 |
| Comp. Ex. 10 | 21 | No | 1 | 0.95 | 7.99 | 0.88 | 0.148 |
| Comp. Ex. 11 | 21 | No | 2 | 0.89 | 7.65 | 0.78 | 0.146 |

TABLE 2-continued

| | | | | | | | |
|---|---|---|---|---|---|---|---|
| Comp. Ex. 12 | 20 | No | 1 | 1.33 | 8.23 | 1.12 | 0.139 |
| Comp. Ex. 13 | 19 | No | 1 | 1.18 | 8.45 | 1.14 | 0.124 |
| Comp. Ex. 14 | 18 | No | 1 | 1.09 | 8.39 | 0.98 | 0.119 |
| Comp. Ex. 15 | 13 | No | 1 | 0.93 | 9.52 | 0.81 | 0.073 |
| Comp. Ex. 16 | Unevaluable[*] | Yes | Unevaluable[*] | Unevaluable[*] | Unevaluable[*] | Unevaluable[*] | Unevaluable[*] |
| Comp. Ex. 17 (silicone) | 27 | No | 1 | 1.57 | 8.31 | 1.43 | 1.201 |
| Comp. Ex. 18 (polyurethane) | 43 | No | 1 | 1.93 | 15.32 | 1.84 | 1.531 |
| Comp. Ex. 19 (natural | 62 | No | 1 | 2.73 | 11.90 | 2.60 | 1.780 |

[*]Physical property evaluation not possible due to bleed-out

Content unit is "parts by mass."

As shown in Table 1, molded articles using the resin compositions of the examples are highly soft and provide a sensation of needle insertion and passability for needles and threads close to those of blood vessels of animals including humans.

The invention claimed is:

1. A resin composition comprising:
   a component (A) hydrogenated block copolymer having a MFR (temperature 230° C., load 2.16 kg) of 1 g/10 min or less;
   a component (B) oil at 350 parts by mass or more and 1000 parts by mass or less with respect to 100 parts by mass of the component (A); and
   a component (C) lubricant at 0.01 parts by mass or more and less than 150 parts by mass with respect to 100 parts by mass of the component (A),
   wherein the component (B) oil has a kinematic viscosity of 0.1-100 mm$^2$/s at 37.8° C. or 40° C.

2. The resin composition according to claim 1, wherein the resin composition is for an artificial blood vessel and/or artificial skin.

3. The resin composition according to claim 1, wherein the component (C) lubricant contains one or more selected from ionic surfactants and nonionic surfactants.

4. The resin composition according to claim 1, wherein the resin composition is thermoplastic.

5. A biological model formed using the resin composition according to claim 1.

6. The biological model according to claim 5, wherein the biological model is an artificial blood vessel or artificial skin.

* * * * *